United States Patent
Levi et al.

(10) Patent No.: US 10,474,908 B2
(45) Date of Patent: Nov. 12, 2019

(54) UNIFIED DEEP CONVOLUTIONAL NEURAL NET FOR FREE-SPACE ESTIMATION, OBJECT DETECTION AND OBJECT POSE ESTIMATION

(71) Applicant: GM GLOBAL TECHNOLOGY OPERATIONS LLC, Detroit, MI (US)

(72) Inventors: Dan Levi, Kyriat Ono (IL); Noa Garnett, Tel Aviv (IL); Ethan Fetaya, Kyriat Ono (IL); Shaul Oron, Tel Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 204 days.

(21) Appl. No.: 15/642,816

(22) Filed: Jul. 6, 2017

(65) Prior Publication Data

US 2019/0012548 A1    Jan. 10, 2019

(51) Int. Cl.
*G06T 7/73*     (2017.01)
*G06K 9/00*    (2006.01)

(52) U.S. Cl.
CPC .......... *G06K 9/00791* (2013.01); *G06T 7/73* (2017.01); *G06T 2207/20081* (2013.01); *G06T 2207/20084* (2013.01); *G06T 2207/30252* (2013.01)

(58) Field of Classification Search
CPC .......... G06K 9/00791; G06K 9/00805; G06K 9/6267; G06T 7/11; G06T 7/73;
(Continued)

(56) References Cited

U.S. PATENT DOCUMENTS

| 6,088,650 A | * | 7/2000 | Schipper | ................ | G01C 21/26 |
| | | | | | 342/457 |
| 7,034,741 B2 | * | 4/2006 | Chon | ..................... | G08G 1/042 |
| | | | | | 342/42 |

(Continued)

OTHER PUBLICATIONS

K. Okada and C. von der Malsburg, "Analysis and synthesis of human faces with pose variations by a parametric piecewise linear subspace method," Proceedings of the 2001 IEEE Computer Society Conference on Computer Vision and Pattern Recognition. CVPR 2001, Kauai, HI, USA, 2001, pp. I-I. (Year: 2001).*

(Continued)

*Primary Examiner* — Gims S Philippe
*Assistant Examiner* — Stefan Gadomski
(74) *Attorney, Agent, or Firm* — Lorenz & Kopf, LLP

(57) ABSTRACT

A method in a vehicle for performing multiple on-board sensing tasks concurrently in the same network using deep learning algorithms is provided. The method includes receiving vision sensor data from a sensor on the vehicle, determining a set of features from the vision sensor data using a plurality of feature layers in a convolutional neural network, and concurrently estimating, using the convolutional neural network, bounding boxes for detected objects, free-space boundaries, and object poses for detected objects from the set of features determined by the plurality of feature layers. The neural network may include a plurality of free-space estimation layers configured to determine the boundaries of free-space in the vision sensor data, a plurality of object detection layers configured to detect objects in the image and to estimate bounding boxes that surround the detected objects, and a plurality of object pose detection layers configured to estimate the direction of each object.

20 Claims, 6 Drawing Sheets

(58) Field of Classification Search
CPC . G06T 2207/10024; G06T 2207/30261; G06T 2207/20081; G06T 2207/20084; G06T 2207/30252
See application file for complete search history.

(56) References Cited

U.S. PATENT DOCUMENTS

| | | | | |
|---|---|---|---|---|
| 8,442,321 | B1* | 5/2013 | Chang | G06K 9/6202 382/181 |
| 9,286,524 | B1* | 3/2016 | Mei | G06K 9/6273 |
| 9,373,057 | B1* | 6/2016 | Erhan | G06K 9/6202 |
| 9,623,905 | B2* | 4/2017 | Shashua | G01C 21/32 |
| 2003/0191568 | A1* | 10/2003 | Breed | B60W 40/06 701/36 |
| 2004/0095374 | A1* | 5/2004 | Jojic | G06T 7/215 715/716 |
| 2004/0234167 | A1* | 11/2004 | Pipitone | G06K 9/00201 382/305 |
| 2005/0267658 | A1* | 12/2005 | Yuan | B60W 30/146 701/36 |
| 2006/0034495 | A1* | 2/2006 | Miller | G06K 9/00214 382/118 |
| 2006/0291798 | A1* | 12/2006 | Suneya | G11B 27/034 386/232 |
| 2007/0021915 | A1* | 1/2007 | Breed | B60N 2/2863 701/301 |
| 2007/0024879 | A1* | 2/2007 | Hamilton, Jr. | H04N 9/045 358/1.9 |
| 2007/0274566 | A1* | 11/2007 | Fujimoto | G06K 9/00369 382/103 |
| 2008/0152218 | A1* | 6/2008 | Okada | G06K 9/00369 382/159 |
| 2008/0187174 | A1* | 8/2008 | Metaxas | G06K 9/00335 382/103 |
| 2009/0041310 | A1* | 2/2009 | Yang | G06K 9/00275 382/118 |
| 2010/0253602 | A1* | 10/2010 | Szczerba | G01S 13/723 345/8 |
| 2011/0054791 | A1* | 3/2011 | Surampudi | G01C 21/005 701/472 |
| 2011/0123118 | A1* | 5/2011 | Nayar | G06T 11/60 382/190 |
| 2011/0311108 | A1* | 12/2011 | Badino | G06K 9/00805 382/106 |
| 2012/0310504 | A1* | 12/2012 | DuHadway | G01C 21/28 701/93 |
| 2013/0251246 | A1* | 9/2013 | Tang | G06K 9/6206 382/159 |
| 2014/0185925 | A1* | 7/2014 | Datta | G06K 9/6256 382/159 |
| 2014/0205184 | A1* | 7/2014 | Franke | G06K 9/00201 382/154 |
| 2014/0313347 | A1* | 10/2014 | Wu | G06T 7/80 348/187 |
| 2015/0010202 | A1* | 1/2015 | Tuzel | G06K 9/00201 382/103 |
| 2015/0206015 | A1* | 7/2015 | Ramalingam | G06K 9/00791 382/104 |
| 2016/0005164 | A1* | 1/2016 | Roumeliotis | G01C 21/165 348/116 |
| 2016/0054452 | A1* | 2/2016 | Cosatto | G01S 19/51 701/412 |
| 2016/0104049 | A1* | 4/2016 | Stenneth | G06K 9/72 382/155 |
| 2016/0140424 | A1* | 5/2016 | Wang | G06K 9/66 382/156 |
| 2016/0217335 | A1 | 7/2016 | Levi et al. | |
| 2016/0247290 | A1* | 8/2016 | Liu | G06K 9/4604 |
| 2016/0275376 | A1* | 9/2016 | Kant | G06K 9/6277 |
| 2016/0300114 | A1 | 10/2016 | Levi | |
| 2016/0343146 | A1* | 11/2016 | Brown | G06K 9/481 |
| 2017/0008521 | A1* | 1/2017 | Braunstein | G01C 21/32 |
| 2017/0093903 | A1* | 3/2017 | Sakalanaga | G06F 9/5027 |
| 2017/0147905 | A1* | 5/2017 | Huang | G06K 9/6232 |
| 2017/0161590 | A1* | 6/2017 | Boulkenafed | G06F 17/50 |
| 2017/0168586 | A1* | 6/2017 | Sinha | G06F 3/017 |
| 2017/0206440 | A1* | 7/2017 | Schrier | G05D 1/021 |
| 2017/0220876 | A1* | 8/2017 | Gao | G06K 9/00805 |
| 2017/0242436 | A1* | 8/2017 | Creusot | G08G 1/005 |
| 2017/0243083 | A1* | 8/2017 | Wang | G06K 9/00711 |
| 2017/0262736 | A1* | 9/2017 | Yu | G06K 9/00718 |
| 2017/0278386 | A1* | 9/2017 | Ko | G08G 1/0112 |
| 2017/0314954 | A1* | 11/2017 | Golding | G01C 21/3644 |
| 2018/0018524 | A1* | 1/2018 | Yao | G06K 9/00362 |
| 2018/0032871 | A1* | 2/2018 | Holt | G06N 3/0454 |
| 2018/0033162 | A1* | 2/2018 | Chang | G06T 7/97 |
| 2018/0101177 | A1* | 4/2018 | Cohen | G05D 1/0246 |
| 2018/0136332 | A1* | 5/2018 | Barfield, Jr. | G01S 17/42 |
| 2018/0137644 | A1* | 5/2018 | Rad | G06T 7/73 |
| 2018/0150701 | A1* | 5/2018 | Kang | G06K 9/4623 |
| 2018/0239969 | A1* | 8/2018 | Lakehal-ayat | G05D 1/0246 |
| 2018/0268240 | A1* | 9/2018 | Loce | G06K 9/00228 |
| 2018/0268601 | A1* | 9/2018 | Rad | G06T 15/205 |
| 2018/0276841 | A1* | 9/2018 | Krishnaswamy | H04N 7/185 |
| 2018/0276986 | A1* | 9/2018 | Delp | G08G 1/005 |
| 2018/0293466 | A1* | 10/2018 | Viswanathan | G06N 3/08 |
| 2018/0300880 | A1* | 10/2018 | Fan | G06T 7/11 |
| 2018/0330175 | A1* | 11/2018 | Corcoran | H04N 5/247 |
| 2018/0348374 | A1* | 12/2018 | Laddha | G01S 17/66 |
| 2018/0349746 | A1* | 12/2018 | Vallespi-Gonzalez | G06K 9/6277 |
| 2018/0365913 | A1* | 12/2018 | Nix | B60W 50/14 |
| 2019/0042892 | A1* | 2/2019 | Wolf | G06T 7/70 |

OTHER PUBLICATIONS

Foytik, J. & Asari, V.K., "A Two-Layer Framework for Piecewise Linear Manifold-Based Head Pose Estimation", Int J Comput Vis (2013) 101: 270. https://doi.org/10.1007/s11263-012-0567-y (Year: 2013).*

Okada R., Soatto S. (2008) Relevant Feature Selection for Human Pose Estimation and Localization in Cluttered Images. In: Forsyth D., Torr P., Zisserman A. (eds) Computer Vision—ECCV 2008. ECCV 2008. Lecture Notes in Computer Science, vol. 5303. Springer, Berlin, Heidelberg (Year: 2008).*

Lai, K.; Bo, L.; Ren, X.; Fox, D.. A Scalable Tree-Based Approach for Joint Object and Pose Recognition. AAAI Conference on Artificial Intelligence, North America, Aug. 2011. (Year: 2011).*

Agarwal, Ankur & Triggs, Bill. (2004). Tracking articulated motion with piecewise learned dynamical models. (Year: 2004).*

Miranda Neto, Arthur & Victorino, Alessandro & Fantoni, Isabelle & Ferreira, Janito. (2013). Real-Time Estimation of Drivable Image Area based on Monocular Vision. IEEE Intelligent Vehicles Symposium, Proceedings. 63-68. 10.1109/IVWorkshops.2013.6615227. (Year: 2013).*

S. Schulter, C. Leistner, P. Wohlhart, P. M. Roth and H. Bischof, "Alternating Regression Forests for Object Detection and Pose Estimation," 2013 IEEE International Conference on Computer Vision, Sydney, NSW, 2013, pp. 417-424.doi: 10.1109/ICCV.2013.59 (Year: 2013).*

Szegedy, C., et al., "Going deeper with convolutions," CVPR 2015, pp. 1-2.

Liu, W., et al., "SSD: Single Shot MultiBox Detector," CVPR 2015, pp. 1-17.

Levi, D., et al., "StixelNet: A Deep Convolutional Network for Obstacle Detection and Road Segmentation," 2015, DOI: https://dx.doi.org/10.5244/C29.109, pp. 109.1-109.12.

* cited by examiner

UNIFIED DEEP CONVOLUTIONAL NEURAL NET FOR FREE-SPACE ESTIMATION, OBJECT DETECTION AND OBJECT POSE ESTIMATION

TECHNICAL FIELD

The present disclosure relates generally to vehicle vision systems and more particularly to the use of neural networks in vehicle vision systems.

BACKGROUND

Vision systems may allow a vehicle to sense objects and obstacles in the road ahead. Vision systems may use neural networks to perform object detection. The neural networks may be computationally intensive. The neural networks may place a high demand on a vehicle's computational capability.

Accordingly, it is desirable to provide a neural network architecture that places a lower demand on a vehicle's computational capability. Furthermore, other desirable features and characteristics of the present invention will become apparent from the subsequent detailed description of the invention and the appended claims, taken in conjunction with the accompanying drawings and the background of the invention.

SUMMARY

A processor-implemented method in a vehicle for performing multiple on-board sensing tasks concurrently in the same network using deep learning algorithms is provided. The method includes receiving vision sensor data from a sensor on the vehicle, determining a set of features from the vision sensor data using a plurality of feature layers in a convolutional neural network, and concurrently estimating, using the convolutional neural network, bounding boxes for detected objects, free-space boundaries, and object poses for detected objects from the set of features determined by the plurality of feature layers.

The neural network may include a plurality of free-space estimation layers configured to evaluate the set of features to determine the boundaries of free-space in the vision sensor data relative to the vehicle and mark the boundaries, a plurality of object detection layers configured to evaluate the set of features to detect objects in the image and to estimate bounding boxes that surround the detected objects, and a plurality of object pose detection layers configured to evaluate the set of features to estimate the direction of each object.

The neural network may further include a plurality of feature layers configured to determine the set of features that are shared as inputs to the plurality of free-space estimation layers, the plurality of object detection layers, and the plurality of object pose detection layers.

The feature layers may be configured using an inception net architecture.

The free-space estimation layers may be configured using a StixelNet architecture.

The object detection layers may be configured using a single shot multibox detector (SSD) architecture.

The direction estimated by the object pose detection layers may be a quantized value.

The method may further include training the object pose detection layers using a cyclic piecewise linear (PL) loss function.

Training the object pose detection layers using a cyclic PL loss function may include assigning a different value between zero and 360 degrees to each of a plurality of bins, assigning, with a weighting factor, an estimated pose to the two bins of the plurality of bins with assigned center values that are closer to the estimated pose value wherein the weighting factor is inversely proportional to the distance of the estimated pose value from the bin center value, and assigning an estimated pose to both the highest value bin and the lowest value bin if the estimated pose value is higher than the value assigned to the highest value bin or if the estimated pose value is lower than the value assigned to the lowest value bin.

The method may further include estimating a current and future world state for use by the vehicle using the estimated bounding boxes, free-space boundaries, and object poses.

A processor-implemented method for training a convolutional neural network to perform at least three different image sensing tasks concurrently in the same network using deep learning algorithms is provided. The convolutional neural network includes at least a first set, a second set, and a third set of task layers and a commonly-used set of feature layers whose output is commonly used by each of the first, second, and third sets of task layers. Each of the first, second, and third sets of task layers is to be trained to perform a different one of three different image sensing tasks. The method includes training the first set of task layers and the set of feature layers to determine coefficients in the first set of task layers and the feature layers that minimize the loss function of the first set of task layers, training the second set of task layers while holding the coefficients in the feature layers fixed to their last determined values to determine coefficients in the second set of task layers that minimize the loss function of the second set of task layers, training the third set of task layers while holding the coefficients in the feature layers fixed to their last determined values to determine coefficients in the third set of task layers that minimize the loss function of the third set of task layers, and retraining the first, second, and third sets of task layers and the feature layers jointly using the last determined coefficients for each of these layers as the starting point for the retraining to determine coefficients in each of the first, second, and third set of task layers and in the feature layers that minimize the loss functions of each of the first, second, and third set of task layers.

The first set of task layers may be the set of task layers for which the greatest quantity of training data is available or the set of task layers for which training data having the greatest quality is available.

The second set of task layers may be the set of task layers for which the second greatest quantity of training data is available or the set of task layers for which training data having the second greatest quality is available.

A plurality of object detection layers may be selected as the first set of task layers, a plurality of object pose detection layers may be selected as the second set of task layers, and a plurality of free-space estimation layers may be selected as the third set of task layers.

The free-space estimation layers may be configured using a StixelNet architecture.

The object detection layers may be configured using a single shot multibox detector (SSD) architecture.

Training the object pose detection layers may include determining a cyclic piecewise linear (PL) loss. Determining the cyclic PL loss may include assigning a different value between zero and 360 degrees to each of a plurality of bins, assigning, with a weighting factor, an estimated pose to the two bins of the plurality of bins with assigned center values that are closer to the estimated pose value wherein the weighting factor is inversely proportional to the distance of the estimated pose value from the bin center value, and assigning an estimated pose to both the highest value bin and the lowest value bin if the estimated pose value is higher than the value assigned to the highest value bin or if the estimated pose value is lower than the value assigned to the lowest value bin.

A processor-implemented method in a vehicle for determining the pose of an object detected by the vehicle is provided. The method includes training, using a cyclic PL loss function, a convolutional neural network that includes a plurality of object pose detection layers configured to evaluate a set of features derived from vision sensor data received from a sensor on the vehicle to estimate the direction of detected objects. The training using the cyclic PL loss function includes assigning a different center value between zero and 360 degrees to each of a plurality of bins, assigning an estimated pose to the two bins of the plurality of bins with assigned center values that are closest to the estimated pose value, and assigning an estimated pose to both the highest value bin and the lowest value bin if the estimated pose value is higher than the value assigned to the highest value bin or if the estimated pose value is lower than the value assigned to the lowest value bin. The method further includes estimating, using the object pose detection layers, an object pose for a detected object in vision sensor data received from the sensor on the vehicle.

Assigning an estimated pose to the two bins may include assigning, with a weighting factor, an estimated pose to the two bins of the plurality of bins with assigned center values that are closest to the estimated pose value wherein the weighting factor is inversely proportional to the distance of the estimated pose value from the bin center value.

BRIEF DESCRIPTION OF THE DRAWINGS

Aspects of the present disclosure are best understood from the following detailed description when read with the accompanying figures, wherein like numerals denote like elements.

DETAILED DESCRIPTION

The following disclosure provides many different embodiments, or examples, for implementing different features of the provided subject matter. The following detailed description is merely exemplary in nature and is not intended to limit the invention or the application and uses of the invention. Furthermore, there is no intention to be bound by any theory presented in the preceding background or the following detailed description.

The subject matter described herein discloses apparatus, systems, techniques and articles for concurrently performing multiple vision sensing tasks in a vehicle using a neural network. The described techniques provide a network architecture wherein a plurality of feature layers are shared by multiple sets of task layers executing concurrently. A technique for training the neural network is also provided.

Figure 1:
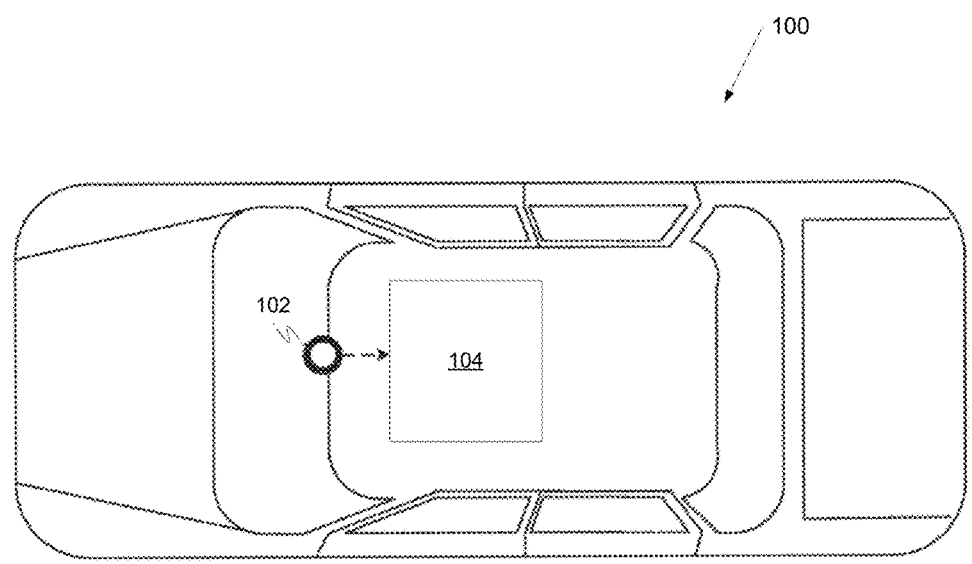
FIG. 1 is a block diagram depicting an example vehicle, in accordance with some embodiments.

FIG. 1 is a block diagram depicting an example vehicle 100. The example vehicle 100 may comprise an automobile, truck, bus, motorcycle, or others. The example vehicle 100 includes an example vision sensor 102 and an example vision system 104. The example vision sensor 102 senses observable conditions in proximity to the vehicle 100 and may comprise a camera, a lidar, a radar, or others. The example vision sensor 102 generates vision sensor data, which is used by the example vision system 104. In this example, the example vision sensor 102 is a camera that generates visual images of a scene outside of the vehicle 100 in the form of image data.

The example vision system 104 receives the image data and processes the image data to perform multiple on-board sensing tasks. The example vision system 104 comprises one or more processors within the vehicle that are configured by programming instructions encoded in computer readable media. The example vision system 104 can perform the multiple on-board sensing tasks concurrently in a neural network using deep learning algorithms that are encoded in the computer readable media and executed by the one or more processors. Example on-board sensing tasks performed by the example vision system 104 may include object detection, free-space detection, and object pose detection. Other systems in the vehicle 100 may use outputs from the on-board sensing tasks performed by the example vision system 104 to estimate current and future world states to assist with operation of the vehicle 100, for example, in an autonomous driving mode or semi-autonomous driving mode.

Each on-board sensing task may use different computational techniques. Each task may use deep learning algorithms and compete for computational resources. Deep learning (also known as deep structured learning, hierarchical learning or deep machine learning) is a class of machine learning algorithms that use a cascade of many layers of nonlinear processing units for feature extraction and transformation. Each successive layer uses the output from the previous layer as input.

Figure 2:
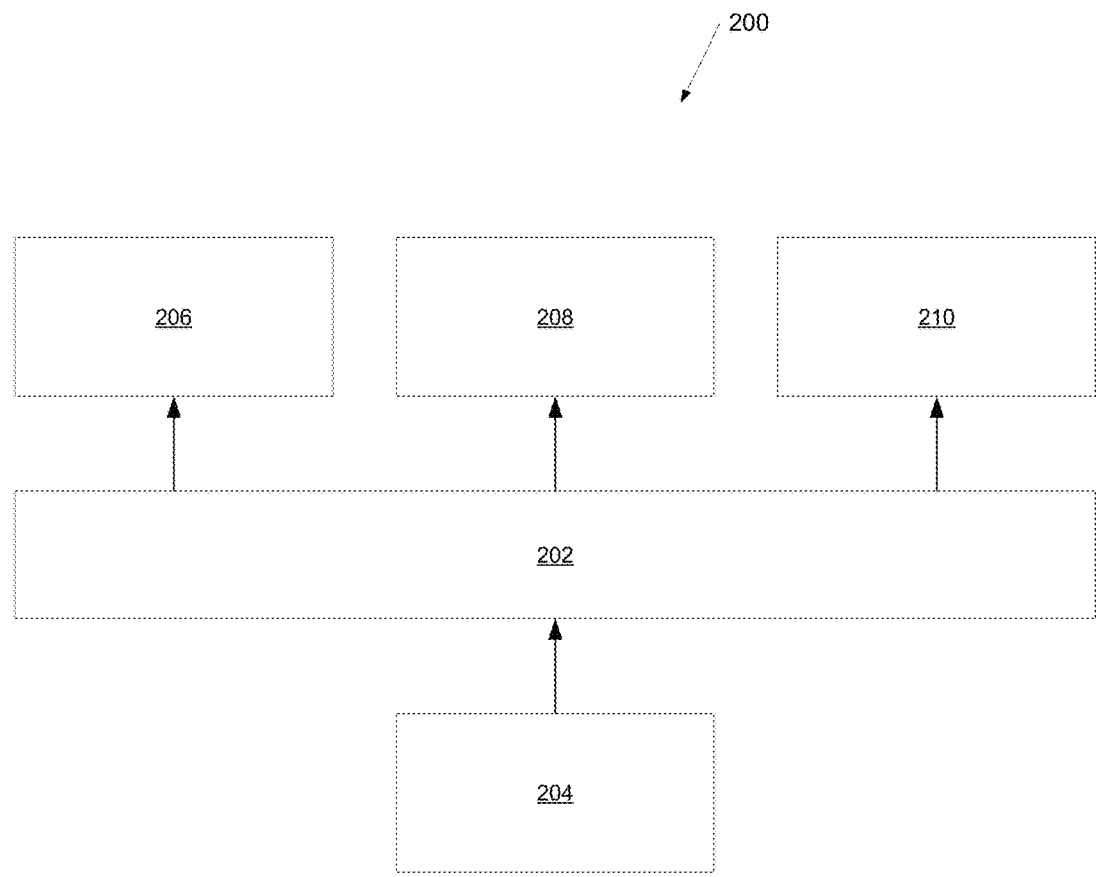
FIG. 2 is a block diagram of an example convolutional neural network that can perform multiple on-board sensing tasks concurrently using deep learning algorithms, in accordance with some embodiments.

FIG. 2 is a block diagram of an example convolutional neural network 200 that can perform multiple on-board sensing tasks concurrently using deep learning algorithms. The example neural network 200 includes a plurality of convolutional feature layers 202 that receive from an image sensor (not shown) an input image 204, for example, in the form of an RGB signal. The feature layers 202 are configured to determine a set of features that are shared as inputs to a plurality of upper-level convolutional vision task layers. The example feature layers 202 may be configured using an inception net architecture.

The upper-level vision task layers, in this example, comprise a plurality of convolutional free-space estimation layers 206, a plurality of convolutional object detection layers 208, and a plurality of convolutional object pose detection layers 210. The plurality of free-space estimation layers 206 are configured to evaluate the set of features to determine the boundaries of free-space in the input image 204 relative to the vehicle and mark the boundaries. In this example, the boundaries are marked with stixels. The plurality of object detection layers 208 are configured to evaluate the set of features to detect objects in the image 204 and to estimate bounding boxes that surround the detected objects. The plurality of object pose detection layers 210 are configured to evaluate the set of features to estimate the direction of each detected object. Detection of the direction of the object, i.e., the object's pose, may allow vehicle systems to predict the motion of each detected object.

The example convolutional neural network 200 is configured via the free-space estimation layers 206, the plurality of convolutional object detection layers 208, and the plurality of convolutional object pose detection layers 210 to concurrently estimate bounding boxes for detected objects, free-space boundaries, and object poses for detected objects from the set of features determined by the commonly-shared feature layers 202. The architecture of the example neural network 200 may result in a more efficient utilization of computational resources than an architecture that performs the free-space estimation task, the object detection task, and the object pose task separately in different neural networks. The example neural network 200 may implement the feature layers using an inception net architecture, the object detection layers using a single shot multibox detector (SSD) architecture, and the free-space detection layers using a StixelNet architecture. An example of the SSD architecture is provided in "SSD: Single Shot MultiBox Detector" by Wei Liu, Dragomir Anguelov, Dumitru Erhan, Christian Szegedy, Scott Reed, Cheng-Yang Fu, and Alexander C. Berg.

The StixelNet architecture works on column portions (e.g., stixels) of an image. The StixelNet architecture may include five layers in which the first two layers are convolutional and the last three are fully connected. The StixelNet architecture may also encompass determining a piecewise-linear probability loss. An example of the use of stixels and the StixelNet architecture is provided in U.S. patent application Ser. No. 15/085,082 to Dan Levi entitled "Dynamic stixel estimation using a single moving camera," which is incorporated herein by reference; U.S. patent application Ser. No. 15/092,853 to Dan Levi and Noa Garnett entitled "Stixel estimation and road scene segmentation using deep learning," which is incorporated herein by reference; and "StixelNet: A Deep Convolutional Network for Obstacle Detection and Road Segmentation" by Dan Levi, Noa Garnett, Ethan Fetaya, which is incorporated herein by reference.

Pose estimation layers are provided with the objective of minimizing a cyclical piecewise linear loss function. The error between a pose prediction and the ground truth pose is measured as an angular difference. For example, the pose prediction may predict that a detected object is pointed at a 15-degree angle whereas the truth pose is that the detected object is pointed at an 18-degree angle. In this case the angular difference is 3 degrees.

Figure 3:
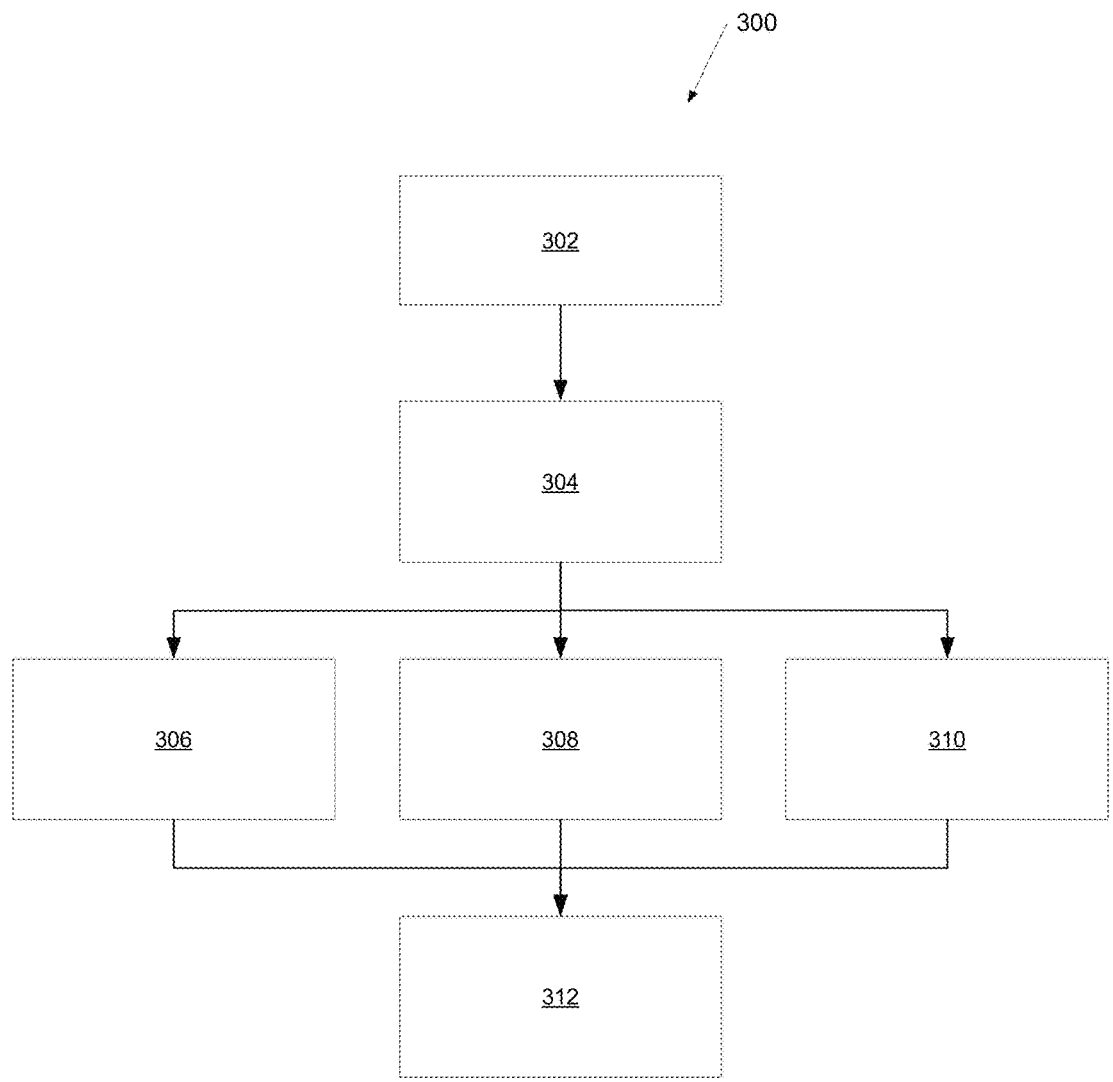
FIG. 3 is a process flow chart depicting an example processor-implemented process for performing multiple on-board sensing tasks concurrently in the same neural network using deep learning algorithms, in accordance with some embodiments.

FIG. 3 is a process flow chart depicting an example processor-implemented process 300 for performing multiple on-board sensing tasks concurrently in the same neural network using deep learning algorithms. The example process 300 includes receiving an input image (operation 302) from an image sensor. The image sensor may be a vehicle-mounted camera that provides an RGB image as the input image.

A set of features from the input image are estimated (operation 304). The set of features may be estimated from a plurality of feature layers in a convolutional neural network. The plurality of feature layers may be implemented using an inception net architecture.

From the set of features, a plurality of vision detection tasks is performed concurrently. The concurrently performed vision detection tasks, in this example, include estimating bounding boxes for detected options (operation 306), estimating free-space boundaries (operation 308), and estimating the pose of detected objects (operation 310). The bounding boxes for detected objects may be estimated by a plurality of object detection layers in the convolutional neural network that may be configured using a SSD architecture. The free-space boundaries in the convolutional neural network may be estimated by a plurality of free-space boundary detection layers that may be configured using a StixelNet architecture.

Object pose may be estimated in the convolutional neural network by a plurality of object pose detection layers. The object pose detection layers may be configured with the objective of minimizing a cyclical piecewise linear loss function. The direction estimated by the object pose detection layers may be a quantized value. In one example, the direction may be one of eight different quantized values. The object pose detection layers may be trained using a cyclic piecewise linear (PL) loss function that determines a cyclic PL loss. Determining the cyclic PL loss may include assigning a different center value between zero and 360 degrees to each of a plurality of bins, assigning an estimated pose to one bin if the estimated pose value equals the value assigned to the one bin, assigning, with a weighting factor, an estimated pose to the two bins of the plurality of bins with assigned center values that are closer to the estimated pose value wherein the weighting factor is inversely proportional to the distance of the estimated pose value from the bin center value, and assigning an estimated pose to both the highest value bin and the lowest value bin if the estimated pose value is higher than the value assigned to the highest value bin or if the estimated pose value is lower than the value assigned to the lowest value bin.

Figure 4:
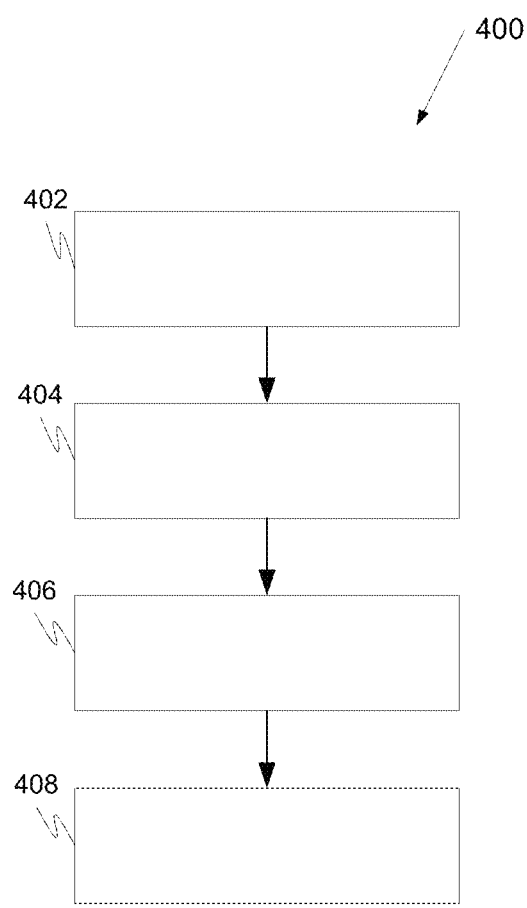
FIG. 4 is a process flow chart depicting an example process for training a convolutional neural network to perform at least three different image sensing tasks concurrently in the same network using deep learning algorithms, in accordance with some embodiments.

FIG. 4 is a process flow chart depicting an example process 400 for training a convolutional neural network to perform at least three different image sensing tasks concurrently in the same network using deep learning algorithms. In this example, the convolutional neural network includes at least a first set, a second set, and a third set of task layers and a commonly-used plurality of feature layers whose output is commonly used by each of the first, second, and third sets of task layers. In this example, each of the first, second, and third sets of task layers is to be trained to perform a different one of three different image sensing tasks.

The example process 400 includes training the first set of task layers and the feature layers (operation 302) to determine coefficients in the first set of task layers and the plurality of feature layers that minimize the loss function of the first set of task layers. The first set of task layers and the plurality of feature layers are trained fully as if they are the only layers in the neural network.

The example process 400 next includes training the second set of task layers while holding the coefficients in the feature layers fixed to their last determined values (operation 404) to determine coefficients in the second set of task layers that minimize the loss function of the second set of task layers.

Next, the example process 400 includes training the third set of task layers while holding the coefficients in the feature layers fixed to their last determined values (operation 406) to determine coefficients in the third set of task layers that minimize the loss function of the third set of task layers.

Finally, the first, second, and third sets of task layers and the feature layers are jointly trained (operation 408) using the last determined coefficients for each of these layers as the starting point for the training to determine coefficients in each of the first, second, and third set of task layers and in the feature layers that minimize the loss functions of each of the first, second, and third set of task layers.

In the example process 400, the set of task layers for which the greatest quantity of training data is available may be selected as the first set of task layers. The set of task layers for which the second greatest quantity of training data is available may be selected as the second set of task layers.

In the illustrated example, a plurality of object detection layers is selected as the first set of task layers. The plurality of object detection layers is selected to be trained to detect objects in an image and to estimate bounding boxes that surround the detected objects.

In the illustrated example, a plurality of object pose detection layers is selected as the second set of task layers. The plurality of object pose detection layers is selected to be trained to determine the object pose of detected objects.

Also, in the illustrated example, a plurality of free-space estimation layers is selected as the third set of task layers. The plurality of free-space estimation layers is selected to be trained to evaluate the set of features to determine the boundaries of free-space in an input image and mark free-space boundaries.

Figure 5:
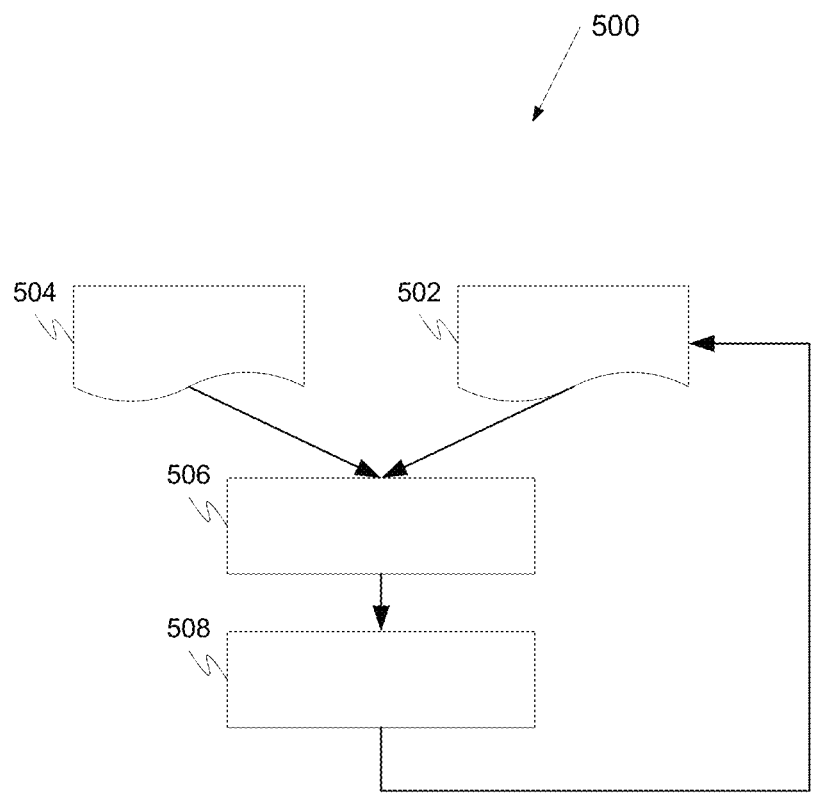
FIG. 5 is a block diagram depicting an example architecture for training a plurality of pose estimation layers, in accordance with some embodiments.

FIG. 5 is a block diagram depicting an example architecture 500 for training a plurality of pose estimation layers. The pose estimation layers are presented with feature data from an image and operated to estimate a predicted pose 502 for an object in the image. The predicted pose 502 is compared with true pose information 504 to estimate an error in a cyclic piecewise linear loss function 506. The piecewise linear loss function 506 is used to train the object pose detection layers 508. The object pose detection layers 508 are presented with features data from another image and operated to estimate a predicted pose 502 for an object in the new image. Again, the predicted pose 502 is compared with true pose information 504 to estimate an error in a cyclic piecewise linear loss function 506, and, in turn, the piecewise linear loss function 506 is used to train the object pose detection layers 508. This training process may be repeated until the error estimate from the cyclic piecewise linear loss function 506 converges to an acceptable level.

The example cyclic piecewise linear loss function 506 is similar to a piecewise linear loss function in that they both classify measurements into one or two bins. The example cyclic piecewise linear loss function 506 used for training the example pose detection layers 508 involves assigning pose estimates into bins. Because an object's pose is estimated as a direction relative to a point on a vehicle, the pose may have a value between zero and 360 degrees. In the example, cyclic piecewise linear loss function 506 used for training example pose detection layers 508, a plurality of bins is provided and each bin is assigned a distinct value between zero and 360 degrees.

Estimating an error using the example cyclic piecewise linear loss function 506 may involve assigning an estimated pose into one or two of the bins. If the pose estimate has a value that is equal to the value of a bin, the pose estimate is assigned to the one bin having the same value. If the pose estimate has a value that is between two bin values, the pose estimate is assigned to the two bins with values closest to that of the pose estimate. A weighting factor may be applied when assigning to two bins. The applied weighting factor can be inversely proportional to the distance of the estimated pose value from the bin center value.

An error may be calculated by subtracting the estimated pose of an object from the true pose. As an example, the true pose of an object may be 17 degrees, the estimate may be 13 degrees and the error may be expressed as 4 degrees. When the pose is near the zero degree/360-degree cross-over point, error calculation may not be as straight forward. As an example, if the true pose is 358 degrees and the estimated pose is four degrees, then the error may only be six degrees and not 354 degrees. To account for this, the example cyclic piecewise linear loss function 506 may allow the estimated pose to be placed in both the bin with a value closest to 360 degrees and the bin with the value closest to zero degrees.

Thus, using the example cyclic piecewise linear loss function 506 to train the example pose detection layers 508 may involve assigning a different value between zero and 360 degrees to each of a plurality of bins, assigning an estimated pose to one bin if the estimated pose value equals the value assigned to the one bin, assigning an estimated pose to two bins if the estimated pose value falls between the values assigned to the two bins, and assigning an estimated pose to both the highest value bin and the lowest value bin if the estimated pose value is higher than the value assigned to the highest value bin or if the estimated pose value is lower than the value assigned to the lowest value bin. A weighting factor may be applied when assigning to two bins. The applied weighting factor can be inversely proportional to the distance of the estimated pose value from the bin center value.

Figure 6:
FIG. 6 depicts an example image that has been annotated with symbols derived from the multiple on-board sensing tasks performed concurrently in a neural network, in accordance with some embodiments.

Depicted in FIG. 6 is an example image 600 that has been annotated with symbols derived from the multiple on-board sensing tasks performed concurrently in a neural network using deep learning algorithms. The example image 600 has been annotated with bounding boxes 602 estimated by object detection layers that surround the detected objects in the image 600, stixels 604 estimated by free-space estimation layers that define the boundaries of free-space in the image 600, and arrows 606 estimated by object pose detection layers that identify the pose direction of the detected objects in the image 600.

Described herein are techniques for concurrently performing multiple vision sensing tasks in a vehicle using a neural network. The described techniques provide a network architecture wherein a plurality of feature layers are shared by multiple sets of task layers executing concurrently. A technique for training the neural network is also provided.

In one embodiment, a processor-implemented method in a vehicle for performing multiple on-board sensing tasks concurrently in the same network using deep learning algorithms is provided. The method comprises receiving vision sensor data from a sensor on the vehicle, determining a set of features from the vision sensor data using a plurality of feature layers in a convolutional neural network, and concurrently estimating, using the convolutional neural network, bounding boxes for detected objects, free-space boundaries, and object poses for detected objects from the set of features determined by the plurality of feature layers.

These aspects and other embodiments may include one or more of the following features. The neural network may comprise a plurality of free-space estimation layers configured to evaluate the set of features to determine the boundaries of free-space in the vision sensor data relative to the vehicle and mark the boundaries, a plurality of object detection layers configured to evaluate the set of features to detect objects in the image and to estimate bounding boxes that surround the detected objects, and a plurality of object pose detection layers configured to evaluate the set of features to estimate the direction of each object. The neural network may further comprise a plurality of feature layers configured to determine the set of features that are shared as inputs to the plurality of free-space estimation layers, the plurality of object detection layers, and the plurality of object pose detection layers. The feature layers may be configured using an inception net architecture. The free-space estimation layers may be configured using a StixelNet architecture. The StixelNet architecture may comprises five layers in which the first two layers are convolutional and the last three are fully connected. Training the StixelNet architecture may comprise determining a piecewise-linear probability loss. The object detection layers may be configured using a single shot multibox detector (SSD) architecture. The direction estimated by the object pose detection layers may be a quantized value. The direction may comprise one of eight different quantized values. The method may further comprise training the object pose detection layers using a cyclic piecewise linear (PL) loss function. Training the object pose detection layers using a cyclic PL loss function may comprise assigning a different value between zero and 360 degrees to each of a plurality of bins, assigning, with a weighting factor, an estimated pose to the two bins of the plurality of bins with assigned center values that are closer to the estimated pose value wherein the weighting factor is inversely proportional to the distance of the estimated pose value from the bin center value, and assigning an estimated pose to both the highest value bin and the lowest value bin if the estimated pose value is higher than the value assigned to the highest value bin or if the estimated pose value is lower than the value assigned to the lowest value bin. The number of bins may equal eight. The method may further comprise estimating a current and future world state for use by the vehicle using the estimated bounding boxes, free-space boundaries, and object poses.

In another embodiment, a processor-implemented method for training a convolutional neural network to perform at least three different image sensing tasks concurrently in the same network using deep learning algorithms is provided. The convolutional neural network comprises at least a first set, a second set, and a third set of task layers and a commonly-used set of feature layers whose output is commonly used by each of the first, second, and third sets of task layers. Each of the first, second, and third sets of task layers is to be trained to perform a different one of three different image sensing tasks. The method comprises training the first set of task layers and the set of feature layers to determine coefficients in the first set of task layers and the feature layers that minimize the loss function of the first set of task layers, training the second set of task layers while holding the coefficients in the feature layers fixed to their last determined values to determine coefficients in the second set of task layers that minimize the loss function of the second set of task layers, training the third set of task layers while holding the coefficients in the feature layers fixed to their last determined values to determine coefficients in the third set of task layers that minimize the loss function of the third set of task layers, and retraining the first, second, and third sets of task layers and the feature layers jointly using the last determined coefficients for each of these layers as the starting point for the retraining to determine coefficients in each of the first, second, and third set of task layers and in the feature layers that minimize the loss functions of each of the first, second, and third set of task layers.

These aspects and other embodiments may include one or more of the following features. The first set of task layers may be the set of task layers for which the greatest quantity of training data is available or the set of task layers for which training data having the greatest quality is available. The second set of task layers may be the set of task layers for which the second greatest quantity of training data is available or the set of task layers for which training data having the second greatest quality is available. A plurality of object detection layers may be selected as the first set of task layers, a plurality of object pose detection layers may be selected as the second set of task layers, and a plurality of free-space estimation layers may be selected as the third set of task layers. The free-space estimation layers may be configured using a StixelNet architecture. The object detection layers may be configured using a single shot multibox detector (SSD) architecture. Training the object pose detection layers may comprise determining a cyclic piecewise linear (PL) loss. Determining the cyclic PL loss may comprise assigning a different value between zero and 360 degrees to each of a plurality of bins, assigning, with a weighting factor, an estimated pose to the two bins of the plurality of bins with assigned center values that are closer to the estimated pose value wherein the weighting factor is inversely proportional to the distance of the estimated pose value from the bin center value, and assigning an estimated pose to both the highest value bin and the lowest value bin if the estimated pose value is higher than the value assigned to the highest value bin or if the estimated pose value is lower than the value assigned to the lowest value bin.

In another embodiment, a processor-implemented sensing system in a vehicle for concurrently performing free-space estimation, object detection, and object pose estimation concurrently on vision sensor data is provided. The sensing system comprises one or more processors and non-transient computer readable media encoded with programming instructions configurable to cause the one or more processors to perform a method. The method comprises receiving vision sensor data from a sensor on the vehicle, determining a set of features from the vision sensor data using a plurality of feature layers in a convolutional neural network, and concurrently estimating, using the convolutional neural network, bounding boxes for detected objects using a plurality of object detection layers in the convolutional neural network configured to evaluate the set of features to detect objects in the image and to estimate bounding boxes that surround the detected objects, free-space boundaries using a plurality of free-space estimation layers in the convolutional neural network configured to evaluate the set of features to determine the boundaries of free-space in the vision sensor data relative to the vehicle and mark the boundaries, and object poses for detected objects using a plurality of object pose detection layers in the convolutional neural network configured to evaluate the set of features to estimate the direction of each object.

These aspects and other embodiments may include one or more of the following features. The method may further comprise estimating a current and future world state for use by the vehicle using the estimated bounding boxes, free-space boundaries, and object poses.

In another embodiment, a processor-implemented method in a vehicle for determining the pose of an object detected by the vehicle is provided. The method comprises training, using a cyclic PL loss function, a convolutional neural network that includes a plurality of object pose detection layers configured to evaluate a set of features derived from vision sensor data received from a sensor on the vehicle to estimate the direction of detected objects. The training using the cyclic PL loss function comprises assigning a different center value between zero and 360 degrees to each of a plurality of bins, assigning an estimated pose to the two bins of the plurality of bins with assigned center values that are closest to the estimated pose value, and assigning an estimated pose to both the highest value bin and the lowest value bin if the estimated pose value is higher than the value assigned to the highest value bin or if the estimated pose value is lower than the value assigned to the lowest value bin. The method further comprises estimating, using the object pose detection layers, an object pose for a detected object in vision sensor data received from the sensor on the vehicle.

These aspects and other embodiments may include one or more of the following features. Assigning an estimated pose to the two bins may comprise assigning, with a weighting factor, an estimated pose to the two bins of the plurality of bins with assigned center values that are closest to the estimated pose value wherein the weighting factor is inversely proportional to the distance of the estimated pose value from the bin center value.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A processor-implemented method in a vehicle for performing multiple on-board sensing tasks concurrently in the same network using deep learning algorithms, the method comprising:
   receiving vision sensor data from a sensor on the vehicle;
   determining a set of features from the vision sensor data using a plurality of feature layers in a convolutional neural network; and
   concurrently estimating, using the convolutional neural network:
   bounding boxes for detected objects using a plurality of object detection layers in the convolutional neural network configured to evaluate the set of features to detect objects in the image and to estimate bounding boxes that surround the detected objects;
   free-space boundaries using a plurality of free-space estimation layers in the convolutional neural network configured to evaluate the set of features to determine the boundaries of free-space in the vision sensor data relative to the vehicle and mark the boundaries; and
   object poses for detected objects using a plurality of object pose detection layers in the convolutional neural network configured to evaluate the set of features to estimate the direction of each object, wherein the object pose detection layers have been trained using a cyclic piecewise linear (PL) loss function, the training comprising:
   assigning a different value between zero and 360 degrees to each of a plurality of bins;
   assigning, with a weighting factor, an estimated pose to the two bins of the plurality of bins with assigned center values that are closer to the estimated pose value wherein the weighting factor is inversely proportional to the distance of the estimated pose value from the bin center value; and
   assigning an estimated pose to both the highest value bin and the lowest value bin if the estimated pose value is higher than the value assigned to the highest value bin or if the estimated pose value is lower than the value assigned to the lowest value bin.

2. The method of claim 1, wherein the neural network further comprises a plurality of feature layers configured to determine the set of features that are shared as inputs to the plurality of free-space estimation layers, the plurality of object detection layers, and the plurality of object pose detection layers.

3. The method of claim 2, wherein the feature layers are configured using an inception net architecture.

4. The method of claim 1, wherein the free-space estimation layers are configured using a StixelNet architecture.

5. The method of claim 1, wherein the object detection layers are configured using a single shot multibox detector (SSD) architecture.

6. The method of claim 1, wherein the direction estimated by the object pose detection layers comprises a quantized value.

7. The method of claim 1, further comprising estimating a current and future world state for use by the vehicle using the estimated bounding boxes, free-space boundaries, and object poses.

8. Non-transient computer readable media encoded with computer programming instructions configurable to cause one or more processors to perform a method in a vehicle of performing multiple on-board sensing tasks concurrently in the same network using deep learning algorithms, the method comprising:
   receiving vision sensor data from a sensor on the vehicle;
   determining a set of features from the vision sensor data using a plurality of feature layers in a convolutional neural network, the convolutional neural network comprising:
   a plurality of free-space estimation layers configured to evaluate the set of features to determine the boundaries of free-space in the vision sensor data relative to the vehicle and mark the boundaries;
   a plurality of object detection layers configured to evaluate the set of features to detect objects in the image and to estimate bounding boxes that surround the detected objects; and
   a plurality of object pose detection layers configured to evaluate the set of features to estimate the direction of each object, wherein the object pose detection layers have been trained using a cyclic piecewise linear (PL) loss function, the training comprising:
   assigning a different value between zero and 360 degrees to each of a plurality of bins;
   assigning, with a weighting factor, an estimated pose to the two bins of the plurality of bins with assigned center values that are closer to the estimated pose value wherein the weighting factor is inversely proportional to the distance of the estimated pose value from the bin center value; and
   assigning an estimated pose to both the highest value bin and the lowest value bin if the estimated pose value is higher than the value assigned to the highest value bin or if the estimated pose value is lower than the value assigned to the lowest value bin; and concurrently estimating, using the convolutional neural network, bounding boxes for detected objects, free-space boundaries, and object poses for detected objects from the set of features determined by the plurality of feature layers.

9. The non-transient computer readable media of claim 8, wherein the neural network further comprises a plurality of feature layers configured to determine the set of features that are shared as inputs to the plurality of free-space estimation layers, the plurality of object detection layers, and the plurality of object pose detection layers.

10. The non-transient computer readable media of claim 9, wherein the feature layers are configured using an inception net architecture.

11. The non-transient computer readable media of claim 8, wherein the free-space estimation layers are configured using a StixelNet architecture.

12. The non-transient computer readable media of claim 8, wherein the object detection layers are configured using a single shot multibox detector (SSD) architecture.

13. The non-transient computer readable media of claim 8, wherein the direction estimated by the object pose detection layers comprises a quantized value.

14. A processor-implemented sensing system in a vehicle for concurrently performing free-space estimation, object detection, and object pose estimation concurrently on vision sensor data, the sensing system comprising one or more processors and non-transient computer readable media encoded with programming instructions configurable to cause the one or more processors to perform a method, the method comprising:

receiving vision sensor data from a sensor on the vehicle;

determining a set of features from the vision sensor data using a plurality of feature layers in a convolutional neural network; and concurrently estimating, using the convolutional neural network:

bounding boxes for detected objects using a plurality of object detection layers in the convolutional neural network configured to evaluate the set of features to detect objects in the image and to estimate bounding boxes that surround the detected objects;

free-space boundaries using a plurality of free-space estimation layers in the convolutional neural network configured to evaluate the set of features to determine the boundaries of free-space in the vision sensor data relative to the vehicle and mark the boundaries; and object poses for detected objects using a plurality of object pose detection layers in the convolutional neural network configured to evaluate the set of features to estimate the direction of each object, wherein the object pose detection layers have been trained using a cyclic piecewise linear (PL) loss function, the training comprising:

assigning a different value between zero and 360 degrees to each of a plurality of bins;

assigning, with a weighting factor, an estimated pose to the two bins of the plurality of bins with assigned center values that are closer to the estimated pose value wherein the weighting factor is inversely proportional to the distance of the estimated pose value from the bin center value; and assigning an estimated pose to both the highest value bin and the lowest value bin if the estimated pose value is higher than the value assigned to the highest value bin or if the estimated pose value is lower than the value assigned to the lowest value bin.

15. The processor-implemented sensing system of claim 14, wherein the neural network further comprises a plurality of feature layers configured to determine the set of features that are shared as inputs to the plurality of free-space estimation layers, the plurality of object detection layers, and the plurality of object pose detection layers.

16. The processor-implemented sensing system of claim 15, wherein the feature layers are configured using an inception net architecture.

17. The processor-implemented sensing system of claim 14, wherein the free-space estimation layers are configured using a StixelNet architecture.

18. The processor-implemented sensing system of claim 14, wherein the object detection layers are configured using a single shot multibox detector (SSD) architecture.

19. The processor-implemented sensing system of claim 14, wherein the direction estimated by the object pose detection layers comprises a quantized value.

20. The processor-implemented sensing system of claim 14, further configured to estimate a current and future world state for use by the vehicle using the estimated bounding boxes, free-space boundaries, and object poses.

* * * * *